United States Patent [19]

Blom et al.

[11] 3,974,588

[45] Aug. 17, 1976

[54] FISHING LURE WITH SELF-SETTING CAPABILITY

[76] Inventors: Gerald E. Blom, 8020 Portland Ave. South, Bloomington, Minn. 55420; Robert W. VanLeuven, 2148 Nancy Circle, Eagan, Minn. 55111

[22] Filed: July 14, 1975

[21] Appl. No.: 595,573

[52] U.S. Cl. .................................................. 43/15
[51] Int. Cl.² ......................................... A01K 97/00
[58] Field of Search ......................................... 43/15

[56] References Cited
UNITED STATES PATENTS

| 2,147,917 | 2/1939 | Noren | 43/15 |
| 2,530,007 | 11/1950 | Euzent | 43/15 |

FOREIGN PATENTS OR APPLICATIONS

| 763,268 | 2/1934 | France | 43/15 |
| 656,164 | 9/1963 | Italy | 43/15 |

*Primary Examiner*—Louis G. Mancene
*Assistant Examiner*—Daniel J. Leach
*Attorney, Agent, or Firm*—Merchant, Gould, Smith, Edell, Welter & Schmidt

[57] ABSTRACT

A fishing lure having a housing designed externally to simulate a bait fish, and arranged to be tied at one end to a line, the other end carrying a hook. The lure may be set so that when a fish pulls lightly on the hook with more than a predetermined force, the hook is first displaced toward the fish and then more strongly away from the fish, thus becoming firmly set in the fish's mouth. To accomplish this, the lure contains a hook shaft, first and second camming means, first and second holding means, first and second spring means, and a triggering disc, interrelated mechanically to give the desired action, together with means manually operable from outside the housing to cooperate with the hook shaft in bringing the lure into its set condition.

10 Claims, 5 Drawing Figures

FISHING LURE WITH SELF-SETTING CAPABILITY

BACKGROUND OF THE INVENTION

This invention relates to the sport of angling, and specifically comprises a fisherman's lure having automatic means for setting the hook in the mouth of a biting fish. It is well known that a game fish can take a bait in its mouth, find it not to its liking, and eject it, thus escaping capture. It is thus the first care of the fisherman to set the hook in a fish's mouth, after which he can proceed to play the fish and ultimately land or net it. Setting the hook is accomplished by a sudden jerk on the line, which forces the hook into the fish's mouth beyond the barb: if a hook is not set, the fish may escape by shaking the hook loose, particularly while it is swimming toward the fisherman more rapidly than the latter is able to reel in line. The angler is initially aware of what is going on beneath the water surface only by such information as travels in the form of vibration up the line to his sensitive fingers. With a long line it is often difficult to determine whether a fish is in fact taking the bait, and it is even more difficult to act rapidly enough to set the distant hook before a wary fish has accepted and then rejected it.

SUMMARY OF THE DISCLOSURE

Our invention comprises a lure incorporating mechanism for detecting the small, initial force exerted by a fish and automatically setting a hook into the fish's mouth without any activity by the fisherman other than the subsequent completion of the catch. To this end, we provide a hollow housing simulative of a bait fish and including an arrangement of springs, holding means, and camming means whereby a minimum force exerted by the fish on a hook shaft causes a mechanical action which results in a sudden jerk on the hook shaft to set the hook in the fish's mouth. A characteristic of our invention is that before being set, the hook shaft is momentarily displaced toward the fish, increasing the likelihood that the hook will be set far enough within the fish's mouth to make capture of the fish more certain.

Various advantages and features of novelty which characterize our invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there is illustrated and described a preferred embodiment of the invention.

DESCRIPTION OF THE PREFERRED EMBODIMENT

Figure 1:
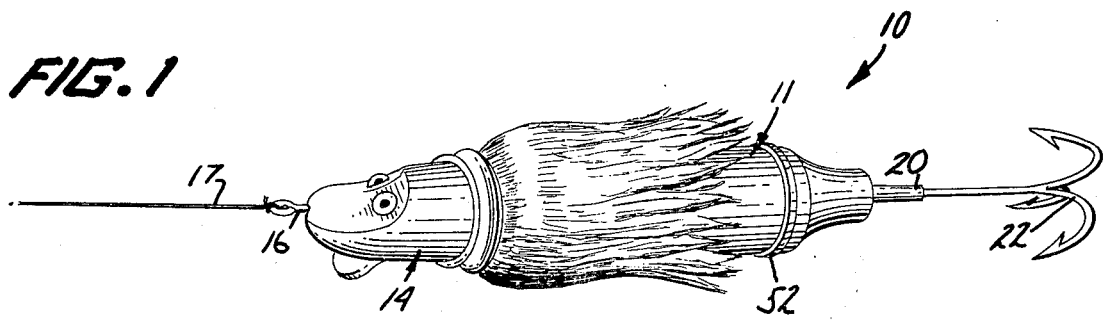
FIG. 1 is a perspective view of the lure in use.

Turning now to the drawings, our lure 10 is shown to comprise a housing 11 extending along an axis from a line end 12 to a hook end 13, and configured in simulation of a bait fish. This line end of the housing may be configured to interchangeably receive one of a plurality of differently appearing fish head simulations, such as member 14, by any releasable connection suggested at 15, and is extended at 16 to provide means for attaching a line 17. A hook shaft 20 projects from end 13 of the housing, and is configured at 21 to receive a hook 22.

Shaft 20 extends into housing 11 through an opening 23, and is shouldered at 24 for a reason presently to be explained. Its smaller inner end 25 is screw threaded to receive a first camming means in the general form of a cylinder 26 having a threaded bore 27, an outer groove 30 having a section of a circular segment, and an extension 31 of reduced diameter defining a shoulder 32. Resilient means in the form of a compression spring 33 is contained in the line end of housing 11: it fits on extension 31 and impels cylinder 26, and hence shaft 20, toward the hook end of the housing. Also included in housing 11 is a holding means in the form of a plurality of detents 34 comprising balls 35 projecting from the ends of restraining tubes 36 under the force of compression springs 37. The balls engage the groove 30 in cylinder 26, and springs 37 are strong enough to hold member 26 and shaft 20 in a retracted position in housing 11 against the force of spring 33. Only a slight additional outward force acting on shaft 20 is necessary, however, to overcome the holding effect of springs 37, whereupon cylinder 26 is displaced toward the hook end of the housing under the full force of spring 33.

In the hook end 13 of housing 11 is contained a resilient member in the form of a compression spring 40 acting between the end of the housing and a disc 41 slidable in housing 11 between first and second locations. Spring 40 is considerably stronger than spring 33, and when unopposed, acts to displace disc 41 toward the line end of the housing to its second position, where it is stopped by detents 34. Disc 41 has a central aperture 42, a pair of semicircular apertures 39, and a plurality of radial bores 43 extend from the rim of the disc to aperture 42. Camming means in the form of a generally cylindrical plug 44 is arranged to be received in aperture 42, and to be freely slidable with respect to the reduced portion 45 of shaft 20 inward from shoulder 24. Plug 44 has a camming surface 46 which merges into a holding surface 47 having the section of a circular segment, and an enlarged head 50. The surface of disc 41 remote from spring 40 is recessed at 51 to receive head 50.

Figure 2:
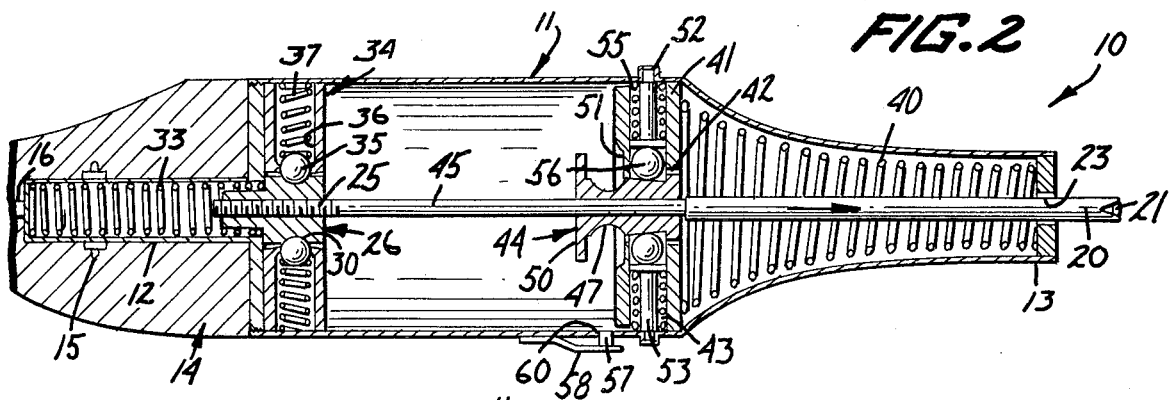
FIG. 2 is a longitudinal vertical section of the lure when set for use.
Figure 3:
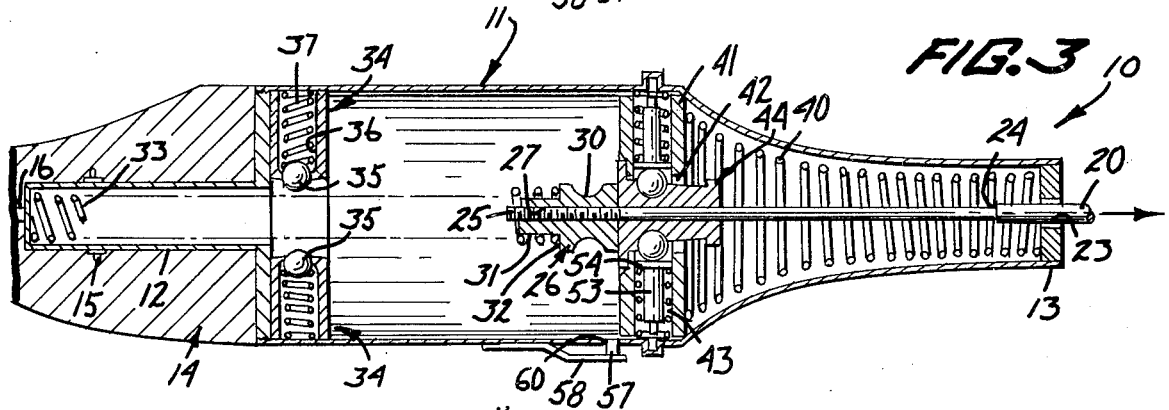
FIG. 3 is a sectional view like FIG. 2 at an intermediate stage in its operation.
Figure 4:
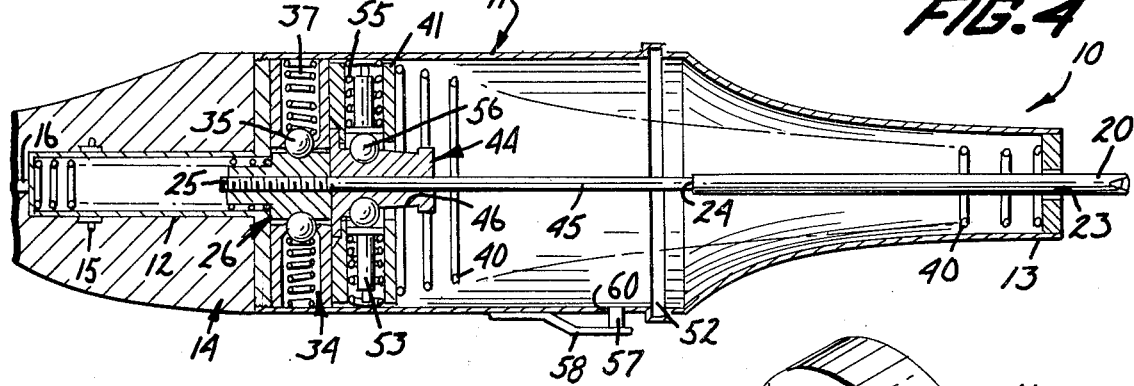
FIG. 4 is a similar view after operation is complete.
Figure 5:
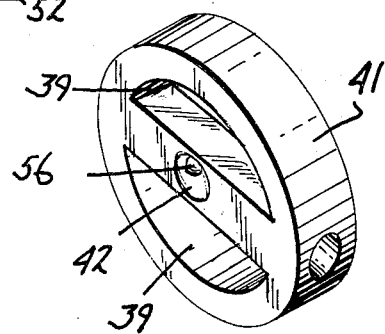
FIG. 5 is a perspective view of a disc used in the lure.

Housing 11 is provided with a peripheral, inwardly opening recess or groove 52. A plurality of locking pins 53 are contained in a like plurality of radial bores 43 which open into aperture 42, and have heads 54 which are engaged by radially inwardly acting resilient means in the form of compression springs 55. Inwardly the head of pins 53 engage cam followers in the form of balls 56. Plug 44 may be in either of two positions with respect to disc 41. As shown in FIG. 2 it is in a "ready" position in which balls 56 engage camming surface 46 compressing springs 55 and causing pins 53 to project into groove 52, thus retaining the disc in its first position in the housing. As shown in FIGS. 3 and 4, the plug is in a "triggered" position with respect to disc 41: here balls 56 engage holding surface 47, which is of less diameter than surfaces 46, thus allowing springs 55 to displace pins 53 out of groove 52 so that there is no means holding the disc in its first position and it may be displaced under the effect of spring 40 toward the line end of the housing.

A manually operable spring arm 58 is mounted on housing 11 and carries a pin 57 which projects through a hole 60 in the housing. Pressure applied to arm 58 causes pin 57 to move into the housing so as to prevent disc 41 from moving out of its first position, independently of pins 52.

FIG. 2 shows the device as ready to operate. Disc 41 is in its first location and plug 44 is in its ready position, so that pins 53 are forced outward against springs 55 to retain the disc in position. Pin 57 is out of the path of disc 41. Cylinder 26 is positioned so that balls 35 are in groove 30, holding the shaft 20 in retracted position.

Now if a slight outward force is applied to hook shaft 20, the effect of springs 37 is overcome. Spring 33 then acts to impel member 26 and hence rod 20 toward the hook end of the housing. Member 26 impinges on head 50 of plug 44, displacing it from the ready position into the triggered position, and releasing pins 53 as shown in FIG. 3. This permits spring 40 to displace disc 41, plug 44, cylinder 26, and rod 20 violently away from the hook end of the housing, and the device takes the condition shown in FIG. 4.

When it is desired to prepare the lure for operation, rod 20 is drawn outwardly until disc 41 takes its first position. Member 58 is now pressed to retain the disc, and shaft 20 is pushed inwardly until cylinder 26 is retained by balls 35. During the last portion of this movement, shoulder 24 has engaged the end of plug 44, moving it from the triggered position to the ready position in which pins 53 engage recess 52. Member 58 may now be released.

From the foregoing, it will be evident that we have invented a new and useful fishing lure which has the capability of automatically setting a hook in the mouth of a fish independently of any action by the fisherman, and that the setting motion is preceded by a short releasing motion which allows the hook to enter the fish's mouth still further before it is set. The device is simple to use and simple to reset, and can be given multifarious appearances by substitution of various fish head simulations.

Numerous characteristics and advantages of our invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

What is claimed is:

1. A fisherman's lure, comprising, in combination:
a housing having means at one end thereof for engaging a line;
a hook shaft slideable in said housing and extending outwardly from the other end thereof to receive a hook;
holding means releasably retaining said shaft in a retracted position in said housing;
and means in said housing effective upon release of said shaft from said holding means for automatically first projecting the shaft further from said housing and then violently returning said shaft to said retracted position.

2. In a fishing lure, in combination:
a hollow housing extending along a central axis between a line end and a hook end;
a centrally apertured trigger disc slideable axially in said housing between a first location nearer said hook end and a second location nearer near said line end;
first generally cylindrical camming means movable axially in the central aperture in said disc between a ready position and a triggered position with respect thereto, and including a central bore, a camming surface merging with a holding surface, and an enlarged head for axially engaging the inward surface of said disc when in said triggered position;
a shaft extending slideably into said housing from the hook end thereof to pass freely through said disc and the central bore of said first camming means;
second camming means secured to the inner end of said shaft;
first, stronger resilient means impelling said disc toward the line end of said housing;
second, weaker resilient means impelling said second camming means toward the hook end of said housing to impinge axially on the head end of said first camming means;
first, normally inoperative holding means in said housing and said disc, operable to retain said disc in said first location against the action of said first resilient means;
second holding means in said housing for releasably retaining said second camming means at a location near the line end of said housing;
and further means in said disc arranged to cooperate with said camming surface of said first camming means in the ready position thereof to maintain operation of said first holding means and with said holding surface of said first camming means in the triggered position thereof to disable said first holding means and releasably secure said disc to said first camming means;
all whereby an outward axial force of greater than a predetermined magnitude exerted on said shaft draws said second camming means from said second holding means to thereupon be impelled by said second resilient means into impingement with the head end of said first camming means for displacing the latter into the triggered position thereof with respect to said disc, disabling said first holding means and enabling said first resilient means to quickly displace said disc, said first camming means, said second camming means, and said shaft toward the line end of said housing.

3. The structure of claim 2 in which said shaft is shouldered and passes freely through said housing and said central bore until said shoulder engages axially the end of said first camming means remote from the line end of said housing.

4. The structure of claim 3 in which said shoulder is so located on said shaft that when said disc is in said first location and said shaft is pushed inwardly until said second camming means is retained in said second holding means, said shoulder has displaced said first camming means into said set position relative to said disc.

5. The structure of claim 4 together with means actuable from outside the housing for temporarily maintaining said disc in said first position independently of said first holding means.

6. Apparatus according to claim 1 in which said housing is configured to simulate a bait fish.

7. Apparatus according to claim 6 together with a simulated fish head as a portion of the line end of said housing.

8. Apparatus according to claim 1 in which the line end of said housing is externally configured to receive interchangeably a number of different appearing fish head simulations.

9. Apparatus according to claim 1 together with:
means for connecting a line to the line end of said housing;
and means for connecting a hook to the outer end of said shaft;

the strength of said first resilient means and the rapidity of said movement of said shaft cooperating to set said hook firmly in the mouth of a fish who has taken the line only sufficiently to pull said camming means out of said first holding means.

10. Apparatus according to claim 2 in which said first holding means comprises:
an inwardly opening recess in said housing;
a radial bore in said disc aligned with said recess in said first location of said disc;
a locking pin displaceable outwardly in said radial bore to enter said recess;
radially acting means resiliently impelling said pin inwardly in said disc away from said recess;
and a spherical cam follower in said radial bore engaged by said pin under the impulsion of said radially acting means, and positioned to engage the camming and holding surfaces of said first camming means selectively in the ready and triggered positions thereof, to prevent and enable respectively radial inward movement of said pin.

* * * * *